United States Patent [19]

Farha, Jr. et al.

[11] 4,072,608
[45] Feb. 7, 1978

[54] POLLUTED WATER PURIFICATION

[75] Inventors: Floyd Farha, Jr.; E. O. Box, Jr., both of Bartlesville, Okla.

[73] Assignee: Phillips Petroleum Company, Bartlesville, Okla.

[21] Appl. No.: 648,687

[22] Filed: Jan. 13, 1976

[51] Int. Cl.$^2$ .............................................. C02B 1/34
[52] U.S. Cl. .................................................. 210/63 R
[58] Field of Search ................... 210/18, 50, 59, 63 R, 210/64; 252/461, 471, 474, 476

[56] References Cited

U.S. PATENT DOCUMENTS

| 2,690,425 | 9/1954 | Moses et al. | 210/63 R |
|---|---|---|---|
| 3,186,942 | 6/1965 | Benger | 210/63 |
| 3,442,802 | 5/1969 | Hamilton et al. | 210/63 |
| 3,487,016 | 12/1969 | Zeff | 210/63 |
| 3,823,088 | 7/1974 | Box et al. | 210/63 |
| 3,957,691 | 5/1976 | Adachi et al. | 252/471 |
| 3,992,295 | 11/1976 | Box, Jr. et al. | 210/63 R |

FOREIGN PATENT DOCUMENTS

| 19,668 | 9/1972 | Japan | 210/63 |

Primary Examiner—Wilbur L. Bascomb, Jr.
Assistant Examiner—Peter A. Hruskoci

[57] ABSTRACT

Organically polluted waters are purified by contacting with a solid copper-manganese-oxygen catalyst promoted with an iron group metal under oxidizing conditions. In one preferred embodiment, an aqueous stream obtained from the effluent of an oxidative dehydrogenation process containing contaminating oxygen-containing organic materials is subjected to oxidizing conditions in the presence of a copper-manganese-iron-oxygen catalyst to convert the water to a potable aqueous product.

9 Claims, No Drawings

POLLUTED WATER PURIFICATION

This invention relates to the purification of organically polluted waters. In accordance with another aspect, this invention relates to a process for converting organic contaminated aqueous streams to fresh potable water by oxidation in the presence of an iron group metal promoted solid copper-manganese-oxygen catalyst. In accordance with another aspect, this invention relates to a continuous process for the abatement of water pollution by removing oxidizable organic wastes from aqueous streams by oxidizing these compounds preferably in the liquid phase in the presence of a solid coppermanganese-iron-oxygen catalyst.

The problem of disposing of waste-containing waters has, in recent years, become more acute due to increasing population and increasing industrial activity. This is particularly true of waters which are polluted by the presence of organic materials such as waters discharged in a chemical process. Frequently, such waste waters contain organic materials in concentrations far too low for them to be conveniently or economically recoverable, yet in concentrations so high that it is impractical and undesirable to simply pump the waste water into available streams, rivers, lakes, or ponds.

Some processes are known in which such organic-containing waste waters can be subjected to air oxidation under elevated temperatures. Such air oxidation converts most or all of the organic matter into harmless materials such as carbon dioxide or water vapor. This reaction is sometimes carried out in the presence of catalysts to promote the oxidation and to allow the reaction to be carried out under less severe conditions.

Although a number of catalysts and catalytic processes are known to carry out such air oxidation, not all catalysts which have activity for promoting oxidation have been found to be suitable. The conditions under which small amounts or organic wastes are oxidized in the presence of large amounts of water are relatively severe. The present invention provides an alternative catalyst and process to achieve this purpose. The outstanding feature of the invention is the activity and durability of the catalyst system.

Accordingly, an object of this invention is to provide an improved process for the purification of organically polluted water.

Another object of this invention is to provide a process for the purification of water streams containing oxygen-containing compounds.

Other objects and aspects, as well as the several advantages of the invention, will be apparent to those skilled in the art upon reading the specification and the appended claims.

In accordance with the invention, a process is provided for converting water contaminated with organic materials to a potable aqueous product by contacting contaminated aqueous streams under oxidation conditions with an iron group metal promoted solid copper-manganese-oxygen catalyst.

More specifically, in accordance with the invention, a process is provided for continuously converting organic contaminated aqueous streams to fresh potable water by contacting in the liquid phase an aqueous stream so contaminated with a solid copper-manganese-iron-oxygen catalyst under conditions so as to produce water essentially free of pollutants.

The pollutants, for example, are dissolved and suspended olefins, paraffins, aromatics, naphthenes, and oxygenated organic compounds including acids, alcohols, aldehydes, ethers, ketones, and the like contained in waste water produced from various chemical and biological sources.

The solid catalysts utilized in the process of this invention consist of copper, manganese, oxygen, and an iron group metal in which the amount of copper present ranges from about 20 to about 65 weight percent, the amount of manganese present ranges from about 20 to about 65 weight percent, the amount of iron group metal or metals present ranges from about 5 to about 50 weight percent, with the balance being oxygen, which amount will be sufficient to meet valence requirements of the metal components of the finished catalysts as no free metal is present. Preferred catalyst compositions, according to the invention, contain from about 30–50 weight percent of each of copper and manganese and about 20–35 weight percent iron group metal(s), with the balance being oxygen. Although iron is the preferred promotor metal, other iron group metals including cobalt and nickel can also be used including mixtures of the iron group metals.

The catalyst compositions of the invention are prepared conventionally by coprecipitation of the hydroxides, carbonates, or oxalates from a solution containing dissolved salts of the metals, by intimate mixing of oxides, carbonates, hydroxides, etc., by milling, grinding, and the like. Soluble contaminants such as sodium nitrate, potassium sulfate, and the like are removed by washing after which the purified material is dried. The dried material can be calcined in air for about 30 minutes to 20 hours or longer at temperatures ranging from 500° F to 1600° F (260°–871° C), more preferably from about 800°–1100° F (426°–593° C). Following calcination, the product can be sized by sieving to obtain particles of the desired size or the product can be converted into wafers, pills, tablets, etc., by employing conventional pilling practices in which lubricants can be employed. When a lubricant is used, it is removed by a second calcination. Alternately, the dried material can be admixed with a minor amount (i.e., about 1–10 weight percent) of a conventional lubricant or processing aid such as polyethylene and formed into tablets, etc. The resulting material is then calcined as described before which removes the lubricant and prepares the product for use. If desired, the finished tablets can be crushed and sieved to obtain a selected particle size range such as, for example, 10 to 20 mesh particles.

Metal salts of copper, manganese, and iron group metals that can be used in forming the catalysts include the acetates, chlorides, formates, nitrates, sulfates, and the like. When dry mixing is employed to formulate the compositions, the oxides, carbonates, hydroxides, oxalates, and the like can be used providing that upon calcination in air the final product has the desired previously cited composition. The calcined product is a catalyst of spinel structure having an ordered crystal structure encompassing all components and has an apparent bulk density of about 1.5 g per cc and a surface area ranging from about 8–50 square meters per gram.

As indicated above, aqueous wastes which are applicable as feeds for the process of the present invention are those which contain minor amounts of dissolved and/or suspended organic materials. The process is particularly applicable for feeds in which the organic materials are hydrocarbons and/or oxygenated hydrocarbons such as are obtained in the aqueous streams recovered from the effluent from an oxidative dehydrogenation process. The organic materials can be present in the predominantly aqueous stream in a broad range of concentrations, but will ordinarily be present in amounts less than about 10 weight percent. It is generally more convenient to characterize the aqueous feeds by the total carbon content. Consequently, such feeds can contain from about 10 to about 100,000 ppm carbon, more frequently 25 to about 10,000 ppm carbon, and still more frequently 100–5,000 ppm carbon.

Such aqueous waste streams can be derived from any source such as chemical or biological sources. For best results, the aqueous waste streams will contain relatively little nonvolatile and/or nonoxidizable inorganic materials.

The process can be carried out under a wide range of oxidation conditions depending upon the feedstock, catalyst, desired degree of removal of organic pollutant, and whether a liquid phase or vapor phase operation is used. Any suitable apparatus is used in a continuous or batch operation. Continuous operation through a fixed catalyst bed is presently preferred such as downflow operation through a vertically positioned fixed catalyst bed although other reaction modes can also be used.

In liquid phase operation, the temperature within the reaction zone generally will range from about 300°–575° F (149°–302° C), with a temperature in the range of about 400°–525° F (204°–274° C) being preferred, and under sufficient pressure to maintain a liquid phase in the reaction zone. Pressures up to 1100 psig (7584 kPa gage) or higher (i.e., 2000 psig or 13,790 kPa gage) can be employed for this purpose. The molar ratio of water to air in the reaction zone will be in the range of 5:1 to 200:1, preferably 8:1 to 50:1. The water feed will generally pass through the reaction zone at a rate of 0.1–10, preferably 2–5, LHSV.

In vapor phase operation, the temperature in the reaction zone will range from about 300°–1200° F (149°–649° C) at any convenient pressure. Generally, pressures ranging from about atmospheric to 100 psig (100–689 kPa gage) will be used. The molar ratio of water to air will be 10:1 to 200:1, preferably 80:1 to 150:1. The water rate will be in the range of 0.1–50, preferably 20–40, LHSV.

It can be seen from the above that in vapor phase operation which utilizes higher temperatures, much higher space rates can be utilized. Nevertheless, because vapor phase operation requires the vaporization of relatively large quantities of water, it is presently preferred to operate under liquid phase conditions.

The catalysts of this invention are active and relatively longlived. When they become less active with the passage of time, they can be regenerated at process temperatures by shutting off the waste water feed and passing air through the catalyst bed.

EXAMPLE

A catalyst sample comprising 26.7 weight percent copper, 23.1 weight percent manganese, 23.4 weight percent iron, and 26.8 weight percent combined oxygen was prepared by dissolving in separate portions of water 274 g of $Cu(NO_3)_2 \cdot 3H_2O$, 406.8 g of $Mn(NO_3)_2 \cdot 6H_2O$, and 125.3 g of $Fe(NO_3)_3 \cdot 9H_2O$. The solutions were combined, diluted to about 2500 cc with water, and to it was slowly added with vigorous stirring sufficient amount of a solution containing 369 g NaOH dissolved in 420 cc of water until a final pH of 8.5–9.0 was reached. The resulting precipitate was filtered from the mother liquor, washed by reslurrying in water, and refiltering (three separate such washing operations) to reduce the sodium ion concentration to about 0.06 weight percent. The filter cake was dried overnight in an air oven at 212° F (100° C), crushed, and sieved through an 80-mesh screen. The resulting powder was mixed with 3 weight percent polyethylene powder and formed into ¼-inch (0.63 cm) tablets at 400 psig (2758 kPa gage) using a conventional pilling machine. The tablets were then calcined in air for 3 hours at 900° F (482° C), cooled, and crushed. The crushed material was sieved to obtain 8–16 mesh granules which were used for test purposes. The final catalyst had an apparent bulk density of 1.4 g/cc and a surface area of 20.6 square meters per gram. The invention catalyst was assigned the code number R-8524-3B.

The waste water treated with the catalyst had an average total oxygen demand (TOD) of 2500 ppm as methyl ethyl ketone, equivalent to 1000 ppm carbon.

The catalyst (25 cc) was charged to a tubular, vertically positioned reactor and through it was continuously passed a mixture of waste water and air under sufficient pressure to maintain liquid phase conditions in the reaction zone. The pressure used was 1000 psig (6894 kPa gage). The other process conditions used and the results obtained are presented in the following table.

The data show the invention catalyst to a be remarkably consistent throughout the test period in oxidizing the ketone contained in the waste water. That is, the quality of the treated water based on TOD remains about the same during the entire test period. Based on analyzed ppm carbon remaining in the treated water, the results show the invention catalyst to be improving with age. The presence of iron in the solid catalyst is thought to be a contributing factor in maintaining its stability and sustained activity.

TABLE I

| Liquid Phase Catalytic Air-Oxidation of Aqueous Wastes over Cu-Mn-Fe-O | | | | | |
|---|---|---|---|---|---|
| Run Number | 1 | 2 | 3 | 4 | 5 |
| Temperature: ° F | 520 | 480 | 520 | 480 | 520 |
| ° F | 271 | 249 | 271 | 249 | 271 |
| Water/Air, mole ratio | 9.3 | 9.7 | 9.6 | 10.3 | 8.8 |
| Water Feed Rate, LHSV[1] | 4.0 | 4.0 | 4.0 | 4.0 | 3.8 |
| Hours on Stream | 124.75 | 235.05 | 325.55 | 502.75 | 1034.0 |
| Product Quality: | | | | | |
| TOD, ppm[2] | <9 | <12 | <10 | 13 | <11 |
| ppm Carbon | 21 | 12 | 16 | 9 | 8.5 |
| % Reduction TOD[3] | ~99.6 | ~99.5 | ~99.6 | 99.5 | ~99.6 |

[1]Volume water/volume catalyst/hour.
[2]Analytical data showing "less than" is interpreted to mean approximately the value listed but no higher.
[3]With some uncertainty shown in analyzed TOD, the corresponding reduction is also approximate, but no lower than the listed value.

We claim:

1. A process for the purification of aqueous streams containing organic material impurities dissolved and suspended therein to aqueous products substantially free of organic material which comprises contacting an aqueous stream containing oxidizable organic pollutant impurities and an oxygen-containing gas with an iron group metal promoted solid copper-manganese-oxygen spinel structure catalyst consisting essentially of about 20–65 weight percent copper, about 20–65 weight percent manganese, about 5–50 weight percent iron group metal(s), and the balance oxygen in an amount which is sufficient to meet the valence requirements of the metal components of the finished catalyst under liquid phase oxidation conditions including a temperature ranging from about 300° F to about 575° F and a ratio of water to oxygen ranging from about 5:1 to 200:1 sufficient to convert said organic materials to innocuous materials, thereby converting said aqueous stream to a potable aqueous product which can be safely discarded or reused.

2. A process according to claim 1 wherein said aqueous stream contains from about 10 to about 100,000 ppm hydrocarbons and oxygen-containing hydrocarbon compounds and is obtained from the effluent from an oxidative dehydrogenation process.

3. A process according to claim 1 wherein said catalyst consists essentially of 30–50 weight percent copper, 30–50 weight percent manganese, 20–35 weight percent iron group metal(s), and the balance oxygen.

4. A process according to claim 1 wherein said oxygen-containing gas is air.

5. A process according to claim 1 wherein said contacting is effected under liquid phase conditions at a temperature in the range of about 400°–525° F (204°–274° C) and wherein the liquid hourly space velocity is in the range of 2 to 5.

6. A process according to claim 1 in which the catalyst consists of copper, manganese, iron, and oxygen, said oxygen-containing gas is air, and said contacting is effected under liquid phase conditions at a temperature in the range of about 400°–525° F (204°–274° C), a liquid hourly space velocity of 2–5, and a molar ratio of water:air of 8:1 to 50:1.

7. A process for the purification of aqueous streams containing organic material impurities dissolved and suspended therein to aqueous products substantially free of organic material which comprises contacting an aqueous stream containing oxidizable organic pollutant impurities and an oxygen-containing gas with an iron group metal promoted solid copper-manganese-oxygen spinel structure catalyst consisting essentially of about 20–65 weight percent copper, about 20–65 weight percent manganese, about 5–50 weight percent iron group metal(s), and the balance oxygen in an amount which is sufficient to meet the valence requirements of the metal components of the finished catalyst under vapor phase oxidation conditions including a temperature ranging from about 300° F to about 1200° F and a ratio of water to oxygen ranging from about 10:1 to about 200:1 sufficient to convert said organic materials to innocuous materials, thereby converting said aqueous stream to a potable aqueous product which can be safely discarded or reused.

8. A process according to claim 7 wherein said oxygen-containing gas is air and said contacting is effected at a liquid hourly space velocity in the range of 0.1–50 and a molar ratio of water to air in the range of 80:1 to 150:1.

9. A process according to claim 7 wherein said aqueous stream contains from about 10 to about 100,000 ppm hydrocarbons and oxygen-containing hydrocarbon compounds and further wherein said catalyst consists essentially of 30–50 weight percent copper, 30–50 weight percent manganese, 20–35 weight percent iron group metal(s), and the balance oxygen.

* * * * *